MULTIPLE CONVERSION TRANSCEIVER UTILIZING
SINGLE OSCILLATOR
Filed Sept. 28, 1964

INVENTOR
H. A. SCHNEIDER
BY R. O. Nimz
ATTORNEY

United States Patent Office 3,324,396

Patented June 6, 1967

3,324,396

MULTIPLE CONVERSION TRANSCEIVER UTILIZING SINGLE OSCILLATOR

Herbert A. Schneider, Millington, N.J., assignor to Bell Telephone Laboratories, Incorporated, New York, N.Y., a corporation of New York Filed Sept. 28, 1964, Ser. No. 399,438

5 Claims. (Cl. 325—20)

This invention relates to mobile radio transceivers and, more particularly, to a novel duplexing arrangement permitting multiple conversion modulation and demodulation with a single frequency source.

The present use of mobile radio communication is limited, in spite of a demand for such service, by the limited number of channels assigned to such usage by Government agencies. In order to fully utilize existing mobile radio frequencies, it is necessary that each mobile station have full access to all the available communication channels. A straightforward approach to the full utilization of all available channels is to provide each individual transceiver with a sufficient number of crystal oscillators to extend its access to all the available channels. Such an approach, however, is not feasible because of the added cost involved in providing extra crystals necessary for the oscillators in every mobile station necessary for the added channels.

A more reasonable approach to achieve full utilization of available transmission channels is to use a duplex transceiver arrangement such as is disclosed in Goodreau Patent 2,985,763, issued May 23, 1961, utilizing a variable channel generator as a multiple frequency source for both transmission modulation and beating frequencies in the receiver. By maintaining all transmit and receive frequencies of each transmission channel at a uniform frequency separation, and utilizing frequency multiplication means, full duplex access to all available channels with a single frequency source can be achieved by using a variable frequency source which is capable of generating several different precisely preselected frequencies.

Because of the high frequencies involved in present mobile radio systems and the small frequency difference between adjacent communication channels, it is important that the receiving portion of the transceiver be highly selective. One method of achieving this selectivity is to use a finely tuned and highly selective filter in the intermediate frequency amplifier of the receiver. Such an arrangement, however, requires the filter to have an extremely sharp resonance characteristic which is difficult to obtain. A better arrangement to achieve good selectivity in the intermediate frequency amplifier is the use of multiple conversions. Multiple conversions permit the use of a plurality of intermediate frequency amplifiers, all able to have identical center frequency to bandwidth ratio characteristics with a gradual bandwidth reduction spread over several stages.

In a multiple conversion receiver, the incoming signal is first filtered by an initital front end filter to give good image suppression. The signal is then injected into a first mixing circuit which converts the incoming signal to some high intermediate frequency. Subsequent mixing stages further reduce the intermediae frequency to achieve the desired high selectivity. In the past, multiple conversion schemes in single oscillator duplex transceivers have always required the addition of separate beating oscillators for the subsequent mixing stages. Because of the multichannel capacity desired in the present transceiver, and the necessity for a fixed frequency final intermediate frequency signal, one of the required beating oscillators in order to provide the channel selectivity would have to provide several high precision frequencies to remain in coordination with the master frequency source. In present multiple conversion schemes for transceivers, at least one fixed local oscillator is associated with one of the latter mixers.

It is therefore an object of the present invention to use a single frequency source in a duplex transceiver and to achieve multiple conversion therein.

It is another object of the invention to achieve a fixed final intermediate frequency equal to the fixed separation between transmitting and receiving frequencies independently of the actual magnitudes of the respective frequencies thereof.

It is yet another object of the invention to provide full duplex mobile transceiver stations with access to all available channels at a minimum expense.

In accordance with the present invention, a transceiver, having paired transmission and receiving frequencies separated by a fixed amount in each communication channel, utilizes one variable frequency source for both transmission and as beating frequency sources for multiple conversion reception in the receiver portion. The multiple conversion is obtained by cascading frequency multipliers which distribute selected multiple factors of the variable frequency source to a plurality of mixers in the receiver.

The selected multiple factors are such that he output frequency of the final mixing stage is equal to the separation of the transmitting and receiving frequencies. Proper selection of the frequency multipliers is necessary to maintain the receiver output frequency as a constant. The required conditions for a proper selection of multiplying factors for a double conversion receiver are represented by the formula:

$$N=N_1(N_2\pm 1) \quad (1)$$

where N is the multiple to which the transmitting frequency is raised, and $N_1$ and $N_2$ are the multiplication factors of the cascaded frequency multipliers interconnecting the variable frequency source to the respective mixing stages of the receiving portion of the transceiver. The cascaded output of both multipliers $N_1$ and $N_2$ is applied to the initial mixing stage, and the output of the frequency multiplier $N_1$, alone, is applied to the final mixing stage.

Similarly, the conditions for a selection of cascaded multiple factors necessary for a triple conversion are represented by the question:

$$N=N_1\{N_2(N_3\pm 1)\pm 1\} \quad (2)$$

where N is the transmitting multiple and $N_1$, $N_2$, and $N_3$, are the individual cascaded multiplication factors. A similar arrangement of cascaded multipliers may be included to achieve multiple conversion in the transmitting portion of the transceiver. Such an arrangement is most useful in single sideband and amplitude modulated transmitters. The relation of the multiples to the over-all multiplication factor is the same as that for the receiving portion.

The chief advantage of arranging the multiplers in a cascaded array over an alternate scheme of separately creating each multiple by individual multipliers is that a minimum number of multipliers are needed. In the alternate scheme where there are separate sets of multipliers to generate each multiplication factor, each separately multiplying the basic frequency for each individual mixer, the number of multipliers needed is greatly increased. Hence, a cascaded scheme to achieve multiple conversion can reduce the number of oscillators and multipliers needed and achieve improved reception.

It is apparent from the above that higher degree multiple conversions of any number are obtainable with a single frequency source by selecting cascaded multiplying factors in accord with the generalized formula:

$$N=N_1\{N_2[N_3(N_4[\ \ldots\ (N_n\pm 1)\ \ldots\ ]\pm 1)\pm 1]\pm 1\} \quad (3)$$

The cascading scheme to provide multiple conversion is advantageous in that it uses but a single channel generator for both the transmitter and the receiver regardless of the number of conversions in either the receiver or the transmitter.

Many other objects and advantages of this invention will be readily seen and understood by reference to the following detailed description when considered in connection with the accompanying drawing wherein.

Figure 1:
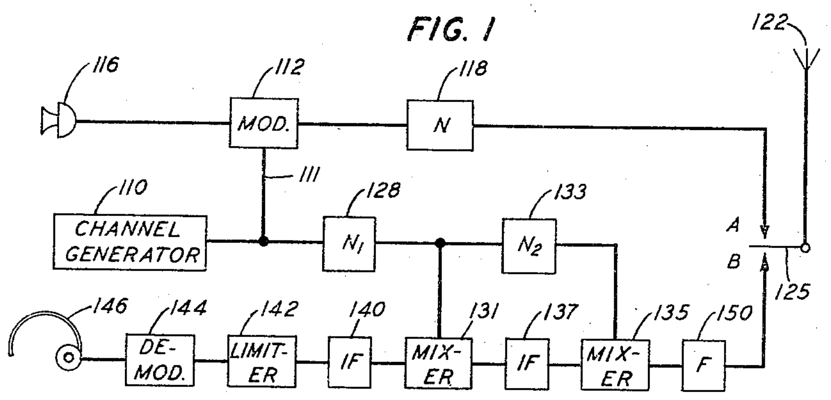
FIG. 1 is a schematic block diagram of a duplex transceiver utilizing the principles of the invention to implement a double conversion in the receiver.

Referring to FIG. 1 in more detail, an illustrative embodiment of a mobile FM radio transceiver utilizing the principles of the invention is shown. The transceiver is designed to receive signals at a plurality of preselected discrete frequencies for each channel. The transceiver transmits signals at a frequency in each channel that differs from the receiving frequency by a preselected constant.

A channel generator 110 supplies a plurality of carrier frequencies for all the available channels. A particular frequency is chosen on the basis of the transmitting and receiving channel to be utilized. The channel generator 110 may comprise a heterodyned, phase-locked oscillator arrangement, such as is disclosed by G. Salmet in Patent 2,870,330, issued Feb. 18, 1953, or by W. Kaminski et al. in Patent 3,139,593, issued June 30, 1964, or any other frequency generating means which is capable of generating a plurality of closely grouped and precise frequencies.

To use the transceiver as a transmitter, the double-throw switch 125 must be placed at position A. To utilize the transceiver as a receiver, the double switch 125 must be at position B. Using the transceiver as a transmitter, audio signals are applied to the microphone 116. The microphone 116 converts the audio signals into electrical signals which are applied to the FM modulating circuit 112. The selected output of the channel generator 110 is likewise applied, via lead 111, to the modulator 112 as the carrier frequency. The audio frequency applied to the modulator 112 by the microphone 116 modulates the frequency of the carrier signal according to the amplitude of the audio signal in the well known manner. It is to be understood that frequency modulation is used for illustrative purposes only, and that several alternative types of modulation may be substituted in its stead without departing from the spirit and scope of the invention.

The frequency modulated signal from modulator 112 is passed through a frequency multiplier 118 to increase the frequency of the modulated signal to the value of the assigned transmitting frequency. The multiplier 118 increases the frequency of the modulated signal by a factor of N. The factor N, as will be shown subsequently, is selected to conform to a precise relationship. Multipliers used to increase signal frequencies are well known in the art and will not be disclosed in detail.

The frequency modulated and multiplied signal is applied, via switch 125, at position A, to the antenna 122, which radiates the signal to be detected by an intended receiver.

The switch 125 is placed at position B to use the transceiver as a receiver. The channel generator frequency, previously adjusted to the appropriate channel to transmit signals, need not be changed. In all of the transmitting and receiving channels, the transmitting frequency and receiving frequency are separated by a constant frequency separation.

The output of the channel generator 110 is applied successively to two cascaded frequency multipliers 128 and 133 which increase the frequency of the injected signals by the factors of $N_1$ and $N_2$, respectively. The multiples of $N_1$ and $N_2$ are selected to satisfy the relationship $$N=N_1(N_2\pm 1) \quad (4)$$

where N is the multiplying factor of multiplier 118, to which the transmitting frequency is raised. $N_1$ and $N_2$ may be any numbers that satisfy the required relationship. However, it is desirable to choose values that with produce suitable intermediate frequencies.

Incoming radio signals are received by the antenna 122 and applied, via the double-throw switch 125 at position B, to a first mixing circuit 135. A front end filter 150 in the receiver is interposed between the antenna and the first mixing circuit 135. The front end filter 150 has a bandwidth sufficient to pass the entire range of frequencies of intelligence signals and rejects all other spurious signals and noise. The mixer 135 is of any well known type and need not be discussed in detail.

The output of the second frequency multiplier 133 is also applied to the first mixing circuit 135. The frequency of the signal output of the second multiple 133 is that of channel generator 110 increased by the factors $(N_1\times N_2)$ of the two frequency multipliers 128 and 133. The first mixing circuit 135 combines the received radio signals and the output of the multiplier 133 and produces therefrom an intermediate frequency signal of a frequency equal to the difference of the original frequencies of the two input signals.

A first intermediate frequency amplifier 137 amplifies and filters the first intermediate frequency signal before it is applied to a second mixing circuit 131.

The signal output of the frequency multiplier 128, which increases the output fresuency of the channel generator by a factor of $N_1$, is also applied to the second mixing circuit 131. The second mixing circuit 131 combines the two signals and generates a signal with a frequency equal to the difference of the frequencies of the two combined signals. This signal is further amplified and filtered to remove unwanted frequencies by a second intermediate frequency amplifier 140.

The intermediate frequency amplifier 140 is tuned to a particular frequency which is equal to the frequency separation between the transmitting and receiving frequencies. This separation is a constant for each transmission channel in the illustrative embodiment, hence, the frequency of the final intermediate frequency signal is a constant except for intelligence signal frequency variation. This result is achieved because the sum of the frequencies of the two mixing signals injected into the mixers is equal to the frequency of the transmitting signal. Intermediate frequency amplifiers are well known in the art and it is not believed necessary to describe them in detail.

The following tabulation of values for N, $N_1$ and $N_2$ illustrates only a few of the many numerical combinations that are available for use in the present invention:

TABLE OF SUGGESTED VALUES FOR N, $N_1$ AND $N_2$

| N | $N_1$=2 | 3 | 4 | 5 | 6 | 7 | 8 | 9 | 10 | 12 | 14 | 15 | 16 | 18 | 20 |
|---|---|---|---|---|---|---|---|---|---|---|---|---|---|---|---|
| 10 | $N_2$= 4<br>6 | | | 1<br>3 | | | | | 0<br>2 | | | | | | |
| 20 | $N_2$= 9<br>11 | | 4<br>6 | 3<br>5 | | | | | 1<br>3 | | | | | | 0<br>2 |
| 30 | $N_2$= 14<br>16 | 9<br>11 | | 5<br>7 | 4<br>6 | | | | 2<br>4 | | | 1<br>3 | | | |
| 40 | $N_2$= 19<br>21 | | 9<br>11 | 7<br>9 | | | 4<br>6 | | 3<br>5 | | | | | | 1<br>3 |
| 50 | $N_2$= 24<br>26 | | | 9<br>11 | | | | | 4<br>6 | | | | | | |
| 60 | $N_2$= 29<br>31 | 19<br>21 | 14<br>16 | 11<br>13 | 9<br>11 | | | | 5<br>7 | 4<br>6 | | 3<br>5 | | | 2<br>4 |
| 70 | $N_2$= 34<br>36 | | | 13<br>15 | | 9<br>11 | | | 6<br>8 | | 4<br>6 | | | | |
| 80 | $N_2$= 39<br>41 | | 19<br>21 | 15<br>17 | | | 9<br>11 | | 7<br>9 | | | | 4<br>6 | | 3<br>5 |
| 90 | $N_2$= 44<br>46 | 29<br>31 | | 17<br>19 | 14<br>16 | | | 9<br>11 | 8<br>10 | | | 5<br>7 | | 4<br>6 | |
| 100 | $N_2$= 49<br>51 | | 24<br>26 | 19<br>21 | | | | | 9<br>11 | | | | | | 4<br>6 |

The available multiplying factors should be selected to produce a suitable first intermediate frequency and to keep the multiplication factor of the respective multipliers at a reasonable level. The factors should be selected to achieve a relatively broad bandwidth in the first intermediate frequency amplifier and filter to accommodate the varying frequencies of all the available channels. The bandwidth of the final filter need only be sufficient to pass a single narrow band of frequency of the intelligence signal which is at a frequency equal to the frequency separation of the transmit and receive signals. Exemplary values of the transmitting and receiving frequencies may be in the 960 to 970 megacycle range. The transmitting frequency may, for instance, be 968 megacycles and the receiving frequency 960 megacycles, a separation of 8 megacycles.

If the channel generator produces a signal having a frequency of 12.100 megacycles, a multiplication factor of $N=80$ is needed to achieve the transmitting frequency. A look at the above table suggests that to keep the multiplication factors low and to achieve a medium range first intermediate frequency, it is desirable to select $N_1$ and $N_2$ of approximately equal value. The values of $N_1=8$ and $N_2=9$ are chosen for illustrative purposes. The first heterodyning signal frequency is the channel generator frequency increased by a factor of $8 \times 9$, or 72, which is 871.2 megacycles. The combination in the first mixer 135 of the received signal and the first heterodyning signal produces a first intermediate frequency of 88.8 megacycles.

The bandwidth of the front end filter 150 must be sufficiently broad to provide adequate image suppression and to handle the entire range of incoming signals, which is 8 megacycles in the example. The bandwidth of the first intermediate frequency amplifier is considerably less, being 800 kilocycles, which is sufficient to pass the entire range of incoming signals as reduced in frequency by the first mixing operation.

The first intermediate frequency signal is applied to the second mixer 131. The heterodyning signal applied to mixer 131 is the channel generator frequency increased by a factor of 8, or 96.8 megacycles. The combination of the two signals produces a final intermediate frequency signal of 8 megacycles, which is equal to the frequency separation of the transmitting and receiving signals. The bandwidth of the final filter need only be sufficient to pass the channel signal band. The gradual filtering permitted by the cascaded arrangement allows the use of a plurality of filter circuits all with a near identically low center frequency to bandwidth ratio. Such a gradual bandwidth reduction is desirable because low resonance filters are easier to construct and high precision frequency control is still maintained.

The channel generator 110 in the illustrative example is designed to generate a plurality of closely spaced frequencies of 12.10000/12.100500, 12.101000 megacycles, et cetera. The various channels of transmitting and receiving frequencies are chosen by selecting one of these channel generator frequencies. Convenient multipliers are chosen to provide practical intermediate frequencies. It is to be understood that the above values are illustrative in nature only and are not intended to limit the scope of applicant's invention. Various other combinations will be immediately apparent to those skilled in the art.

The output of the second intermediate frequency amplifier and filter is applied to a limiting circuit 142. The limiting circuit is designed to remove any unwanted amplitude modulation to which the incoming signal may have been subjected. Such limiting circuits are well known in the art and need not be discussed in detail.

The output of the limiting circuit 142 is applied to the discriminating circuit 144 which derives amplitude variations in response to frequency variations of the applied signals. The audio output of the discriminating circuit 144 is applied to an audio output device which may comprise a headset 146 as illustrated or a speaker arrangement or any other electroacoustic transducer means, or other intelligence signaling means known in the art.

It is to be understood that the same cascaded multiplication scheme of providing a plurality of related injection frequencies may also be applied to the transmitter portion of the transceiver. Multiple stages of conversion are frequently used in single sideband and amplitude modulated transmitters to keep spurious signals and undesired conversion products to a satisfactory low level. Multiple conversion is also frequently utilized in amplitude modulated and single sideband receivers to achieve more desirable bandpass and rejection characteristics.

Figure 2:
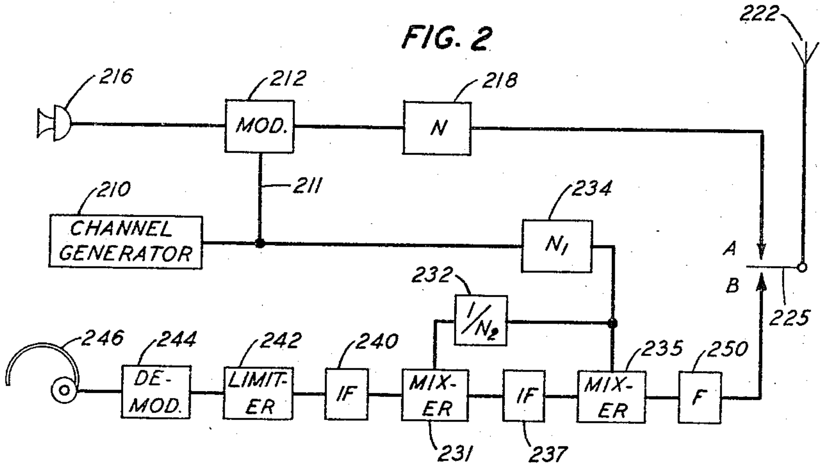
FIG. 2 is a schematic block diagram of an alternative embodiment of the duplex transceiver shown in FIG. 1.

Referring to FIG. 2, an alternative embodiment is illustrated as a means of implementing the present invention. The embodiment therein disclosed illustrates the possible inclusion of a frequency divider in the cascaded array as an alternative to two cascaded frequency multipliers. The transceiver circuit is identical to that of FIG. 1 with the exception of the circuit arrangement of the frequency multipliers. The components of FIG. 2 have therefore been identified by reference numerals corresponding to the reference numerals of FIG. 1 but with the hundreds digits changed from "1" to "2." Only the frequency multiplying scheme will be described in detail.

The output signal of the channel generator 210 is applied to a frequency multiplier 234 which increases the frequency of the signal by a factor of $N_1$. The signal output of the multiplier 234 is applied to the mixing circuit 235. The mixing circuit combines this signal with the received signal and produces a difference signal in the well known manner.

The signal output of the multiplier 234 is also applied to a frequency divider 232 which adjusts the frequency of the signal by a factor of $1/N_2$. The signal output of the divider 232 is applied to a second mixer 231 which also receives the signal output of the first mixing circuit 235, by way of intermediate frequency amplifier 237. The mixing circuit 235 combines the two signals and produces therefrom a difference frequency signal. If the output frequency of the channel generator 210 is increased by a factor of N during transmission, the relation of this factor to the factors $N_1$ and $N_2$ is given by $$N=N_1\left(1\pm\frac{1}{N_2}\right) \quad (5)$$

It can easily be seen that various other combinations of multipliers and dividers may be devised to achieve multiple conversion transmission without departing from the spirit and scope of the invention.

Figure 3:
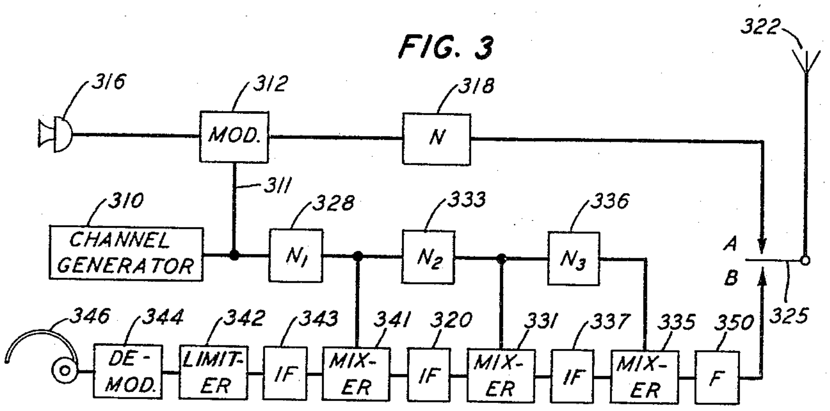
FIG. 3 is a schematic block diagram of a duplex transceiver utilizing the principles of the invention to implement a triple conversion in the receiver.

Referring to FIG. 3, an adaptation of applicant's invention is illustrated for triple conversion. The structural difference over the circuit illustrated in FIG. 1 is the addition of a third cascaded multiplier 336 with a multiplication factor of $N_3$ and a third mixing stage 335, and intermediate frequency amplifier 337. The relation of the various multipliers to achieve this triple conversion with a fixed final frequency is given by the relation $$N=N_1[N_2(N_3\pm1)\pm1] \quad (6)$$

It can be seen that this scheme can be extended to quadruple conversion and even higher order conversion schemes if desired. It is also clear that varied arrays of mixed multipliers and dividers may be utilized in these extended multiple conversion systems without departing from the spirit and scope of applicant's invention.

It is to be understood that the invention is not to be limited to the specific embodiments described and shown above, but is to include the many modifications and variations within the spirit and scope of the invention.

What is claimed is:

1. A communication system for receiving signals at each of a plurality of frequencies each separated by a constant frequency difference from a corresponding transmitting frequency, an adjustable source of frequency oscillation, a plurality of frequency multiplying means to generate a plurality of multiples of the frequency of said adjustable source, means to utilize a first multiple of said adjustable source as the transmitting frequency, means to utilize a second multiple of said adjustable source to heterodyne received signals to form a first variable intermediate frequency, and means to utilize a third multiple of said adjustable source to heterodyne said first intermediate frequency to form a second fixed intermediate frequency equal to said constant frequency difference, said first multiple being equal to the sum of said second and third multiples, said second multiple being equal to a number comprising the product of two preselected numbers, and said third multiple being equal to one of said preselected numbers.

2. The communication system in claim 1 wherein said means to utilize a third multiple includes a first frequency multiplier with a multiplication value of $N_1$ and said means to utilize a second multiple includes a second frequency multiplier in a cascaded array with said first multiplier, the combined multiplication of the two multipliers having a value of $N_1N_2$, said multiplication values corresponding to said first multiple represented by N according to the relation $$N=N_1(N_2\pm1)$$

3. The communication system in claim 1 wherein said means to utilize a second multiple includes a frequency multiplier in a cascaded array with a frequency divider, said multiplier and said divider including the multiplication values of $N_1$ and $1/N_2$, respectively, and said means to utilize a third multiple including only said frequency multiplier having a multiplication value of $N_1$, said multiplication values corresponding to said first multiple N according to the relation $$N=N_1\left(1\pm\frac{1}{N_2}\right)$$

4. In combination, a plurality of paired transmitting and receiving signal frequencies separated by a constant frequency difference, a variable source of preselected frequency signals, means to modulate selected ones of said preselected frequency signals, means to increase the frequency of said modulated signal by a factor of N, means to receive said receiving signals paired to said transmitting signals, means to derive a plurality of intermediate frequency signals from said received signals including a plurality of mixing circuits, and means to change the frequency of said preselected signals at a plurality of separate stages by the factors $(N_1)$, $(N_1\cdot N_2)$, $$(N_1\cdot N_2\cdot N_3)\ \ldots\ (N_1N_2\ \ldots\ N_n)$$

respectively, said factors being related to the factor N by the expression $$N=N_1[N_2(N_3\ \ldots\ (N_n\pm1)\ \ldots\ \pm1)\pm1]$$

said plurality of frequencies being individually applied successively to said plurality of mixing stages in the order of declining value of absolute frequency to derive a final intermediate frequency equal to said constant frequency difference, and means to demodulate the final intermediate frequency of said received signal.

5. A multichannel transceiver to communicate via selected ones of a plurality of communication channels having transmitting and receiving signal frequencies in each channel which are separated by a fixed frequency, said multichannel transceiver comprising a transmitter and a receiver, an adjustable source of precise frequency signals, means in said transmitter to modulate the output of said adjustable source of precise frequency signals with an audio signal, signal multiplication means having a multiplication factor of N to increase the frequency of the modulated signal to the value of the transmission frequency of a selected communication channel, means to heterodyne received radio signals of said selected communication channel to produce a final intermediate frequency signal having a constant frequency, said constant frequency being equal to said frequency separation between said transmitting and receiving frequencies, said heterodyning means comprising a plurality of $n$ series connected mixing circuits in said receiver, a plurality of cascade connected frequency multipliers equal to said plurality of $n$ mixing circuits and connected to said adjustable source, the multiplication factors of said cascade connected frequency multipliers respectively having the values $N_1$, $N_2$, $N_3$ . . . $N_n$ and connected in the same order wherein $$N=N_1[N_2(N_3\ \ldots\ (N_n\pm1)\ \ldots\ \pm1)\pm1]$$

and means to apply the output of successive ones of said cascade connected frequency multipliers to successive ones of said mixing circuits to heterodyne the received signals therein such that the frequency output applied to the final mixer producing said final fixed intermediate frequency signal is $N_1$ times the frequency of said source and the frequency output applied to each successive one of said series connected mixers is respectively $N_1N_2$, $N_1N_2N_3$, . . . , and $N_1N_2N_3 \ldots N_n$ times the frequency of said source.

References Cited

UNITED STATES PATENTS

| | | | |
|---|---|---|---|
| 2,317,547 | 4/1943 | McRae | 325—20 |
| 3,147,437 | 9/1964 | Crafts et al. | 325—153 X |

FOREIGN PATENTS

Ad. 61,433 11/1954 France.

DAVID G. REDINBAUGH, *Primary Examiner.*

JOHN W. CALDWELL, *Examiner.*